Nov. 2, 1965      H. L. PHARES      3,214,897
STALK SHREDDER AND PULVERIZER
Filed Sept. 24, 1964                    3 Sheets-Sheet 2
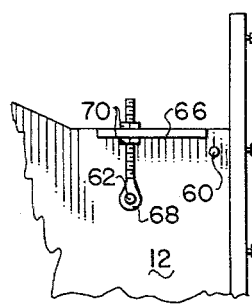
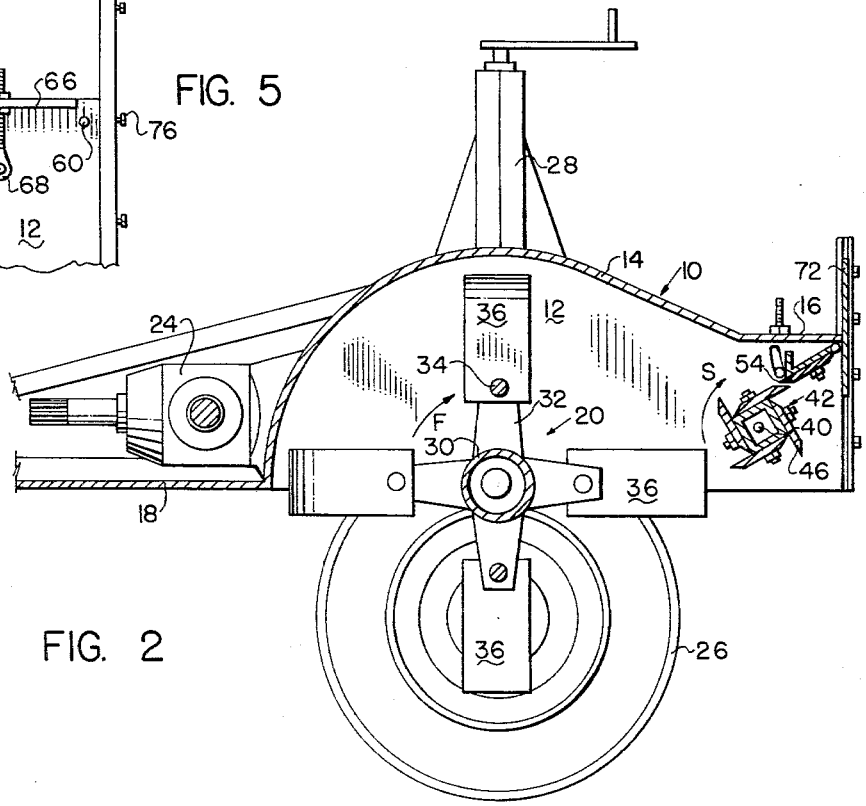
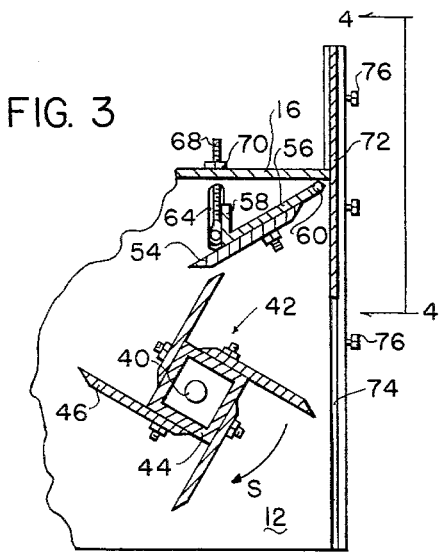
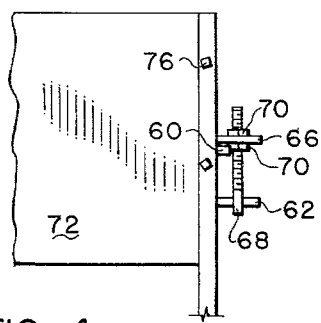
HOWARD L. PHARES
*INVENTOR.*

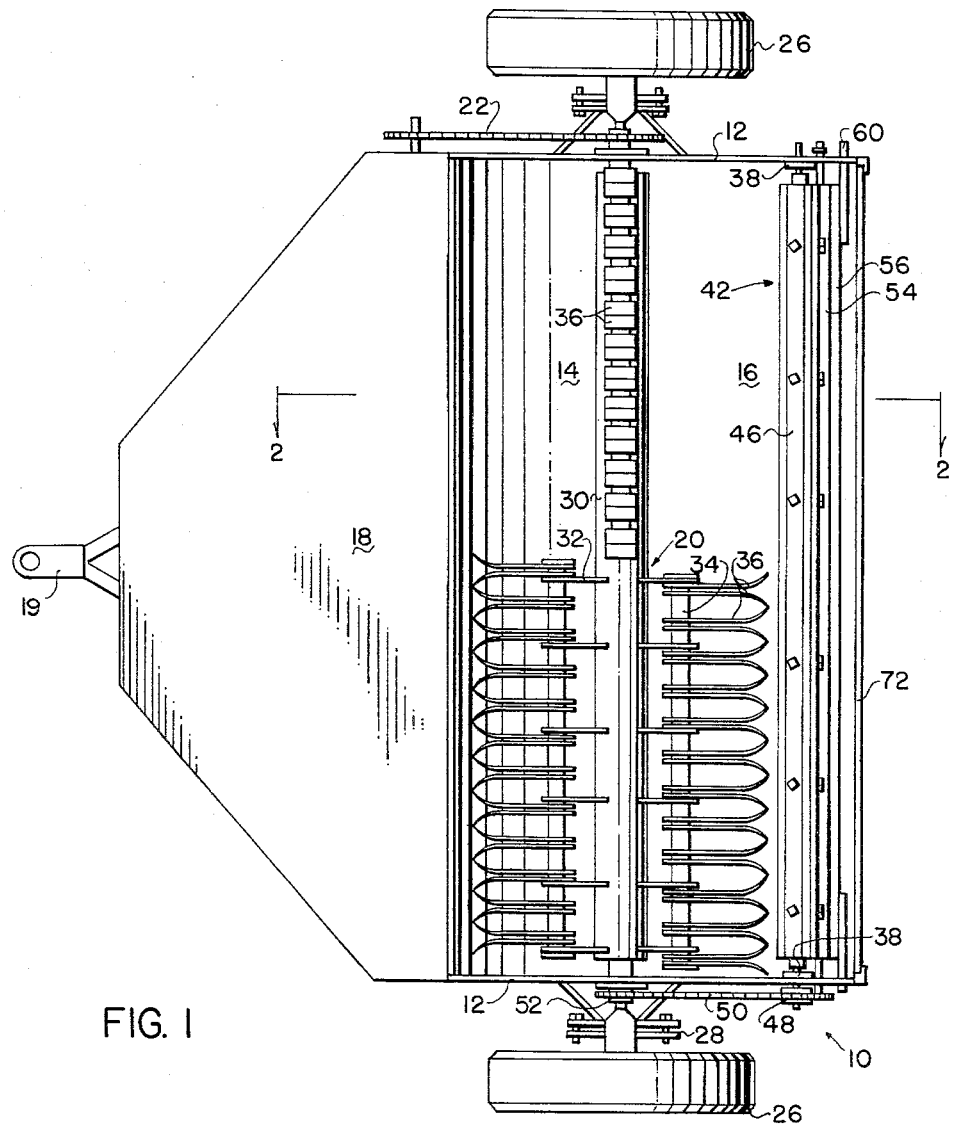

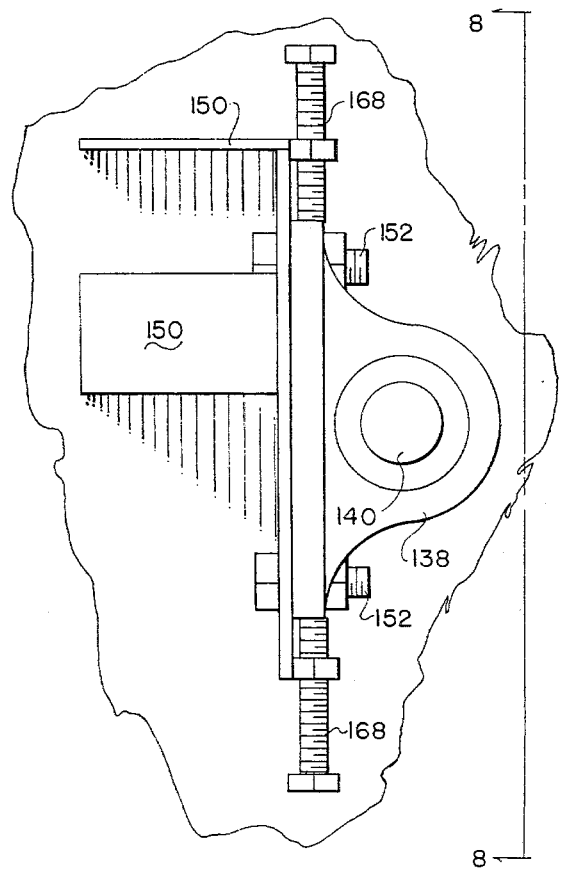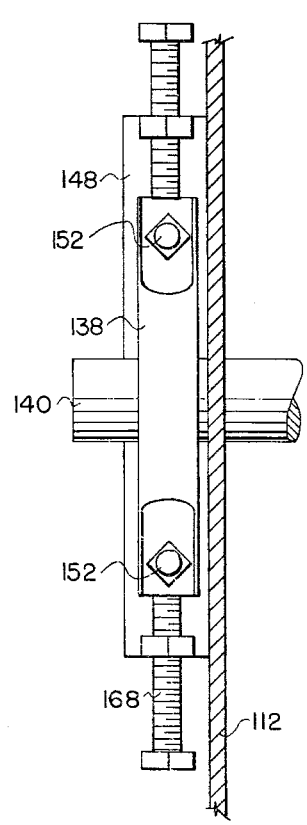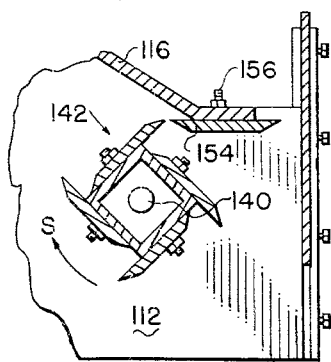

United States Patent Office 3,214,897
Patented Nov. 2, 1965

3,214,897
STALK SHREDDER AND PULVERIZER
Howard L. Phares, Lubbock, Tex., assignor to Phares & Wilkins Manufacturing Company, Lubbock, Tex., a co-partnership
Filed Sept. 24, 1964, Ser. No. 398,905
4 Claims. (Cl. 56—505)

This invention relates to agricultural implements for shredding stalks of various plants and comminuting the stalks into a mulch to be spread evenly on the ground.

This aplication discloses an improvement of the invention disclosed in my United States Patent 3,027,702 which issued April 3, 1962.

In agricultural practices it is desirable to shred in field stalks of growing plants, eg., cotton stalks. Also it is desirbale that these stalks be broken into small bits or pieces so they do not interfere with subsequent farming operations. This is particularly true in areas where the growing season is quite long and there is only a short time between the harvesting of one crop and the planting of the next crop and insufficient time for decay of large stalk particles.

It is also desirable that this mulch be spread evenly upon the ground and not windrowed along the ground.

I have provided a machine for this purpose which utilizes a flail type stalk shredder as disclosed in my patent noted above which has incorporated therewith a chopper or mill or comminutor which receives the shredded stalks from the flail shredder and further chops or grinds or pulverizes or comminutes them until they are considerably reduced in size to be spread upon the ground so that another crop might be planted soon thereafter.

Another object of this invention is to shred and pulverize the stalks of agricultural crops.

Another object of this invention is to provide a comminuted mulch evenly spread upon the ground from the stalks of growing crops.

Another object is to achieve the above with an operation requiring low amounts of power and that is rapid in operation.

Further objects are to achive the above with a device that is sturdy, compact, durable, simple, versatile, and reliable, yet inexpensive and easy to manufacture and operate.

Still further objects are to achieve the above with a method that is rapid, inexpensive, and does not require skilled people to operate.

The specific nature of the invention as well as other objects, uses, and advantages thereof will clearly appear from the following description and from the accompanying drawing, the different views of which are not necessarily to the same scale, in which:

FIG. 1 is a bottom view of a machine according to this invention.

FIG. 2 is a partial cross sectional view taken on line 22— of FIG. 1.

FIG. 3 is an enlarged sectional detail showing a portion of the same mechanism shown in FIG. 2.

FIG. 4 is a partial rear view of the machine showing details as would be seen substantially as viewed on line 4—4 of FIG. 3.

FIG. 5 is a partial end view of the machine showing details of construction as would be seen viewing one end of the machine.

FIG. 6 is an enlarged sectional detail similar to FIG. 3 of a modification.

FIG. 7 is a partial end view of the modification of FIG. 6.

FIG. 8 is a sectional view of the modification taken on line 8—8 of FIG. 7.

Referring more specifically to the drawings, it may be seen that this machine includes a housing 10. The housing includes two end plates 12 which have a semi-circular configuration and the cover 14 which is a cylindrical configuration forming a cavity on the inside thereof. It will be understood that the term cylindrical is used in its broadest meaning. It does not neecsarily mean a portion from a circular cylinder inasmuch as the rear portion 16 of the cover extends somewhat tangentially from the circular portion. Front apron 18 is attached to the front of the housing 10. Hitch 19 forms means for attaching the implement t oa draft vehicle and is attached on the forward portion of the apron 18.

Flail or shredding reel 20 is mounted within the cavity of the cover 14. The flail reel 20 is journaled for rotation within the housing 10 and the axis of the reel 20 is normal to the direction of draft as determined by the hitch 19. As may be seen the flail reel is co-axial with the cylindrical configuration of the housing 10. Chain 22 and gear box 24 form part of a transmission means to transmit power from the draft vehicle (not shown) to the fiail reel 20 to rotate same in the direction of arrow F. It will be noted that the flail reel 20 rotates so that when it is in motion that the flails forward of the center of the reel are moving upward so that the flails cut on a forward and upward stroke bringing the shredded stalks up into the air and up within the housing 10. If flail reel 20 were rotated in the opposite direction the flails would drive the shredded material down onto the ground.

The housing 10 is supported by two wheels 26 at an adjustable height by adjustment mechanism 28.

The flail reel 20 includes a central shaft 30 in the form of a tube with a plurality of ears 32 attached thereto. The ears 32 are arranged in rows, and each row of ears has shaft 34 extending through it carrying a plurality of flails 36. The flails are arranged back to back and the end of each flail is bent outward so that the two fiails together form a Y shaped configuration. It will be understood that the flail reel 20 is a means in the cavity of the housing 10 for severing the plant stalk and also it is a means for forming a stream of severed plant stalks along the wall of the cavity inside the housing. The above material is more fully set out in my issued patent identified above with the exception of the particular configuration of the shape of the rear portion 16 of the cover 14.

A bearing 38 is mounted on the rearward portion of each of the end plates 12. Shear reel shaft 40 is journaled in the bearings 38. The shear reel shaft 40 mounts the shear reel 42 for rotation about its axis. The shear reel 42 includes square tube 44 with a shear blade 46 bolted to each of the sides of the tube 44. Each of the blades 46 has an edge on the periphery of the shear reel 42 which is parallel to the axis of the shear reel. The shear reel 42 is parallel to the axis of the flail reel 20 and therefore normal to the direction of the draft.

One end of the shear reel shaft 40 protrudes from the bearing 38 on one end of the housing and has sprocket 48 mounted thereon which, by means of chain 50, the shear reel 42 is driven from sprocket 52 on the flail reel 20. Ledger blade 54 is attached to the housing 10 adjacent to the periphery of the shear reel 42 so as to form a shear as the shear reel is rotated in the direction of arrow S. It will be noted that the shear mechanism or means for shearing formed by the shear reel 42 and the ledger blade 54 are located on a tangential line from the rear portion 16 of the housing 10.

In operation the stalks which are shredded by the flail reel 20 are carried as a stream or current or flow or sluice of shredded stalks along the inside concave housing 10 and are carried to the shearing mechanism. They are fed as a stream into the shearing mechanism and there are comminuted or sheared or pulverized into a mulch and discharged upon the ground.

It will be noted that the shear blades 46 are straight and not helical. Were the shear blades helical, they would tend to windrow the mulch to one side or the other which is undesirable. It is more desirable to distribute the mulch evenly as are the stalks which are comminuted.

In the embodiment of FIGS. 1-5, the ledger blade 54 is mounted so that it may be adjusted closer or farther from the shear reel 42. The ledger blade is bolted upon angle bar 56 which has a vertically disposed leg 58 to stiffen the angle bar. Pivot bars 60 are welded to the rear of each end of the angle bar 56. The pivot bars 60 extend through openings in the rear of the end plates 12 so that the angle bar and ledger blade attached thereto are freely swingable about the pivot bars 60. The axis of the pivot bars 60 is parallel to the axis of the shear reel 42. Adjustment pin 62 extends from the front of each end of angle bar 56 through vertical elongated slot 64 in the end plates 12. Ear 66 extends from outward from each side of the rear of the rear portion 16 of the cover. Eye bolt 68 has an eye which encircles the adjustment pin 62 and extends through a hole in the ear 66. Adjustment nuts 70 on either side of the ear 66 provides adjustment of the ledger blade 54 closer or farther away from the shear reel 42. It will be noted that the ledger blade 54 extends tangentially of the shear reel 42. I.e., if the ledger blade were adjusted downwardly until it contacted the shear blades that the contact would be along the bevel of the ledger blade and not at the tip or the cutting edge of the ledger blade.

Adjustable back curtain 72 is provided within vertical slots 74 formed on the extreme rear of each of the end plates 12. The curtain 72 is held in an adjusted position by a plurality of set screws 76.

As a matter of construction, I prefer to use the same stock to form the flails 36, the shear blades 46 and the ledger blade 54. All three of these items are reversible so that as one edge becomes dull, it may be unbolted and the other edge brought into use.

In the modification shown in FIGS. 6-8 the adjustment of the shearing mechanism is by movement of shear reel 142 relative to stationary ledger blade 154.

The shear mechanism of the modification is designed to be used with the housing 10, but the end plates 112 and rear portion 116 of the cover have been renumbered to indicate slight changes in shape.

The ledger blade 154 is attached by bolts 156 to the rear portion 116. Shear reel shaft 140 (upon which the shear reel 142 is supported) is journaled in bearings 138. Mounting plate 148 is welded to end plate 112 and braced by brackets 150. The mounting plate 148 is vertical. Bolts 152 attach the bearing 138 to the mounting plate 148 through slots so that the bearing and thus the shear reel 142 may be vertically adjusted by screws 168 closer or farther from ledger blade 156. Inasmuch as the flail reel and shear reel are about level, the adjustment does not greatly change the tension in the drive chain.

It will be apparent that the embodiments shown are only exemplary and that various modifications can be made in construction, materials, and arrangement within the scope of the invention as defined in the appended claims.

I claim as my invention:

1. A machine for transforming standing plant stalks into comminuted mulch comprising:
   (a) a housing,
   (b) said housing having a cylindrical configuration,
   (c) means on the housing for moving the housing through a field of standing stalks,
   (d) a flail reel journaled for rotation within the housing,
   (e) said flail reel having an axis normal to the direction of movement of the housing,
   (f) and co-axial with the cylindrical configuration,
   (g) said flail reel having a plurality of flails pivoted thereto,
   (h) means for rotating the flail reel so that stalks are severed by the flails and formed into a stream along the inside cylindrical surface of the housing,
   (j) a shear reel journaled for rotation in the housing,
   (k) said shear reel having an axis parallel to the flail reel axis,
   (m) said shear reel having a plurality of blades parallel to the axis of the shear reel attached thereto,
   (n) said shear reel adjacent a tangent of the housing so that the stream of severed stalks is directed to the shear reel, and
   (o) a ledger blade adjacent the shear reel to shear the severed stalks in cooperation with the blades on the shear reel.

2. This inventions as defined in claim 1, wherein,
   (p) the mounting of the shear reel and the ledger blade is adjustable as to the spacing there between.

3. This invention as defined in claim 1, wherein
   (p) said shear reel is journaled in bearings, and
   (h) means for adjustably mounting the bearings on the housing so that the spacing between the shear reel and ledger blade is adjustable.

4. A machine for transforming standing plant stalks into comminuted mulch comprising:
   (a) a housing,
   (b) said housing having a cylindrical configuration,
   (c) means on the housing for moving the housing through a field of standing stalks,
   (d) a shredding reel journalled for rotation within the housing,
   (e) said shredding reel having a horizontal axis normal to the direction of movement of the housing,
   (f) and aligned with the cylindrical configuration,
   (g) means for rotating the shredding reel so that stalks are shredded by the shredding reel and formed into a stream along the inside cylindrical surface of the housing,
   (h) a shear reel journaled for rotation in the housing,
   (j) said shear reel having an axis parallel to the shredding reel axis,
   (k) said shear reel having a plurality of blades parallel to the axis of the shear reel attached thereto,
   (m) said shear reel adjacent a tangent of the housing so that the stream of severed stalks is directed to the shear reel, and
   (n) a ledger blade adjacent to the shear reel to shear the severed stalks in cooperation with the blades on the shear reel.

References Cited by the Examiner

UNITED STATES PATENTS

| | | | |
|---|---|---|---|
| 2,491,739 | 12/49 | La Dow | 56—505 X |
| 2,571,652 | 10/51 | Bass | 56—60 X |
| 2,671,300 | 3/54 | Kinkead | 56—249 |
| 2,725,702 | 12/55 | Ross | 56—60 X |
| 2,734,328 | 2/56 | Wood | 56—505 X |

ABRAHAM G. STONE, *Primary Examiner.*